United States Patent [19]

Sakurai et al.

[11] Patent Number: 4,840,029
[45] Date of Patent: Jun. 20, 1989

[54] EXHAUST GAS CONTROL MEANS FOR ENGINE

[75] Inventors: Tadashi Sakurai; Wataru Fuchigami, both of Iwata, Japan

[73] Assignee: Yamaha Hatsudoki Kabushiki Kaisha, Iwata, Japan

[21] Appl. No.: 22,434

[22] Filed: Mar. 6, 1987

[30] Foreign Application Priority Data

Mar. 7, 1986 [JP] Japan .................................. 61-48490
Mar. 7, 1986 [JP] Japan .................................. 61-48491
Mar. 7, 1986 [JP] Japan .................................. 61-48492

[51] Int. Cl.⁴ .............................................. F02B 27/02
[52] U.S. Cl. ..................................................... 60/313
[58] Field of Search ........................... 60/312, 313, 314

[56] References Cited

U.S. PATENT DOCUMENTS

| | | |
|---|---|---|
| 933,906 | 9/1909 | Illy . |
| 1,411,226 | 3/1922 | Stumpf . |
| 2,230,740 | 2/1941 | Birkigt . |
| 2,239,262 | 4/1941 | Violet . |
| 2,305,946 | 12/1942 | Wilson et al. . |
| 2,627,851 | 2/1953 | Cushman . |
| 2,644,436 | 7/1953 | Berlyn . |
| 2,686,398 | 5/1954 | Anderson . |
| 2,717,583 | 9/1955 | Maybach et al. . |
| 3,523,418 | 8/1970 | Marsee . |
| 3,703,937 | 11/1972 | Tenney .................................. 60/314 |
| 3,751,921 | 8/1973 | Blomberg et al. . |
| 3,817,227 | 6/1974 | Onishi . |
| 3,938,330 | 2/1976 | Nakajima et al. . |
| 3,969,895 | 7/1976 | Krizman . |
| 4,051,821 | 10/1977 | Amann . |
| 4,226,298 | 10/1980 | Bancel .................................. 60/314 |
| 4,254,752 | 3/1981 | Friddell et al. . |
| 4,522,029 | 6/1985 | Tomita et al. . |
| 4,539,813 | 9/1985 | Tomita et al. . |
| 4,545,200 | 10/1985 | Oike et al. . |
| 4,554,785 | 11/1985 | Oike . |
| 4,558,566 | 12/1985 | Shirakura . |

FOREIGN PATENT DOCUMENTS

| | | | |
|---|---|---|---|
| 567194 | 1/1986 | France .................................. | 60/313 |
| 51-54118 | 5/1976 | Japan . | |
| 32920 | 2/1985 | Japan .................................. | 60/324 |
| 262044 | 6/1926 | United Kingdom . | |
| 231156 | 9/1926 | United Kingdom . | |
| 519806 | 4/1940 | United Kingdom . | |
| 542429 | 1/1942 | United Kingdom . | |
| 561932 | 6/1944 | United Kingdom . | |
| 572724 | 10/1945 | United Kingdom . | |

Primary Examiner—Douglas Hart
Attorney, Agent, or Firm—Ernest A. Beutler

[57] ABSTRACT

Several embodiments of exhaust systems including reflective valve means interposed between the engine exhaust ports and an expansion chamber for improving performance at mid range and under low speeds. The reflective means comprise a plurality of rotatably supported members that are affixed to different shafts and the shafts are coupled together for simultaneous rotation. In some embodiments, the shafts are coupled by a linkage system and in another by means of a gear system. The shafts are journaled in either the same or separate valve housings and the valve members may be positioned on different horizontal planes or at an angle to each other to suit a variety of exhaust pipe configurations.

13 Claims, 9 Drawing Sheets

EXHAUST GAS CONTROL MEANS FOR ENGINE

BACKGROUND OF THE INVENTION

This invention relates to an exhaust gas control means for an engine and more particularly to an improved exhaust gas valve arrangement that improves the engine performance.

A well known expedient for increasing the output of an internal combustion engine is to employ large degrees of valve overlap so as to improve the breathing capacity of the engine at high speeds. However, as is well known, engines having high degrees of valve overlap tend to have poor low speed and mid range performance. It has been discovered that one reason for this poor mid range performance is the formation of pulses in the exhaust gases which tend to pass back into the combustion chamber during the period of valve overlap and cause the exhaust gases to flow outwardly through the intake passage thus precluding the induction of a proper fuel air mixture for smooth running.

As is disclosed in the copending patent applications of Hideaki Ueda, entitled "High Performance Exhaust Systems For Internal Combustion Engine", Ser. Nos. 935,340 pending and 935,342 pending, filed Nov. 26, 1986, and assigned to the assignee of this application, it has been found that these poor mid range running conditions may be overcome through the use of a reflective valve that is disposed in the exhaust pipe between the exhaust ports and an expansion chamber. By appropriately positioning these reflective valves in response to the engine running characteristics, the effects of the exhaust pulses in causing reduced induction can be overcome and performance significantly improved.

In accordance with the arrangement shown in those patent applications, it is desirable to provide an individual reflective valve in each of the exhaust pipes of the engine. This, however, can cause certain problems in connection with design and operation. if individual operators are provided for each of the reflective exhaust valves, the system becomes very complicated and placement of all of the associated components can be difficult. However, if all of the valves are affixed for rotation with a common valve shaft, there are a number of other disadvantages which can arise. Because of the fact that the valve shaft passes through the exhaust pipes, expansion can become a problem. Furthermore, the longer the shaft becomes, the greater the expansion problems are.

Also, if the valves are all affixed to a common valve shaft, then the placement of the valves becomes interdependent and it may not be possible to place all of the valves at the optimum location. In addition to this disadvantage, the placement of all of the valves on a common valve shaft dictates that the exhaust pipes must also run parallel to each other in the are of this valve shaft. This is not always desirable or possible.

It is, therefore, a principal object of this invention to provide an improved exhaust gas control means for an engine.

It is a further object of this invention to provide an arrangement for operating a plurality of exhaust control valves simultaneously without necessitating their all being carried by a common shaft.

It is a further object of this invention to provide a multiple exhaust gas control valve arrangement wherein there is greater latitude in the positioning of the individual valves while at the same time maintaining common control for them.

It is yet another object of this invention to provide an interrelated exhaust control valve arrangement for an engine wherein the valves may be placed at different axial locations relative to each other.

SUMMARY OF THE INVENTION

This invention is adapted to be embodied in an exhaust system for an internal combustion engine having first and second juxtaposed exhaust pipe. A first reflective means is rotatably supported on a first shaft in the first exhaust pipe and its rotatable position determines its effective reflective area. In a like manner, a second reflective means is rotatably supported on a second shaft in the second exhaust pipe and its rotatable position determines its effective reflective area. In accordance with the invention, motion transmission means are incorporated for rotatably coupling the first and second shafts.

DETAILED DESCRIPTION OF THE PREFERRED EMBODIMENTS

Figures 1, 14:
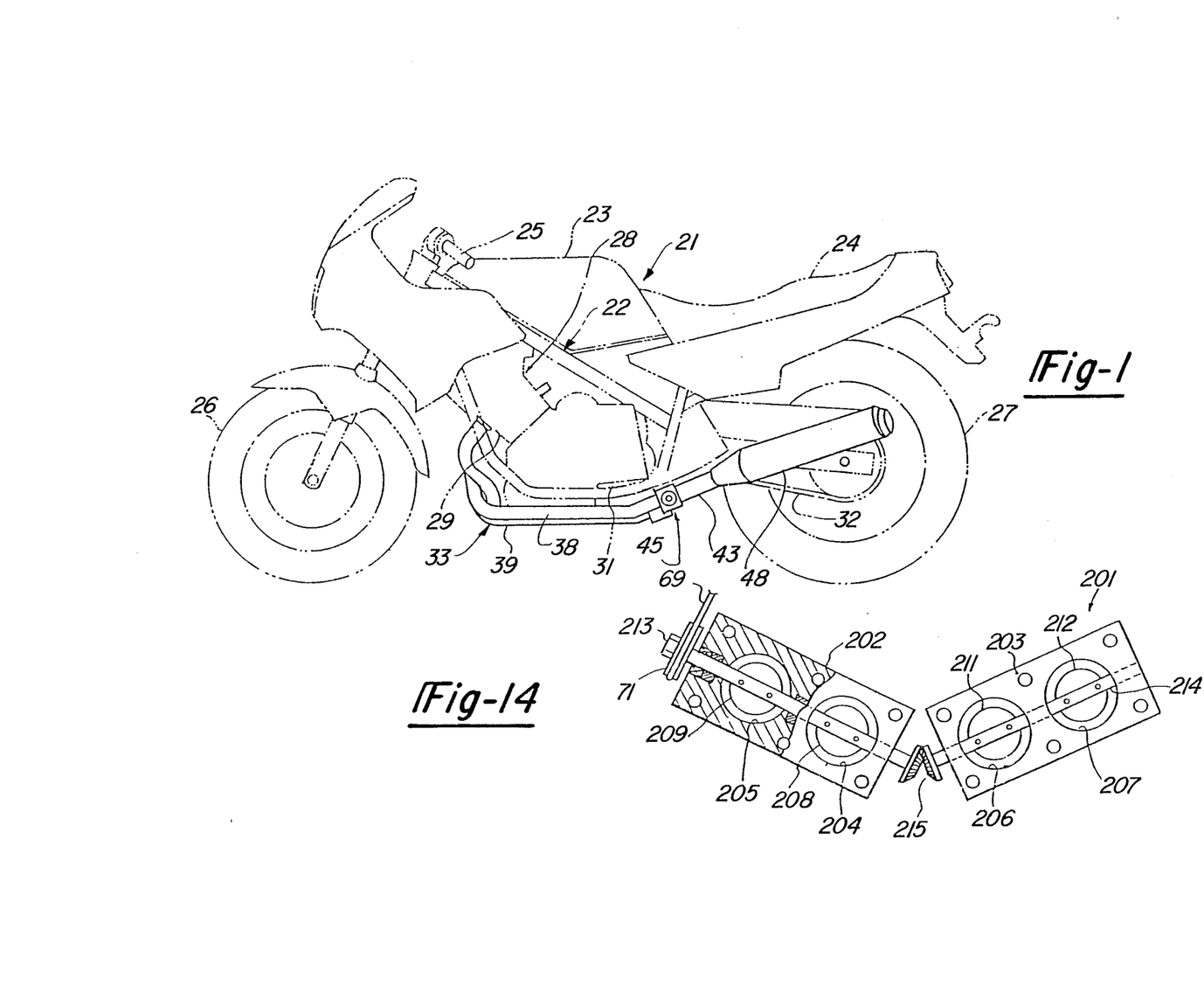
FIG. 1 is a side elevational view of a motorcycle having an exhaust system constructed in accordance with an embodiment of the invention, with portions of the motorcycle other than the exhaust system being shown in phantom.
FIG. 14 is an enlarged end elevational view, with a portion broken away, of the control valve arrangement of the embodiment of FIG. 13.
Figure 2:
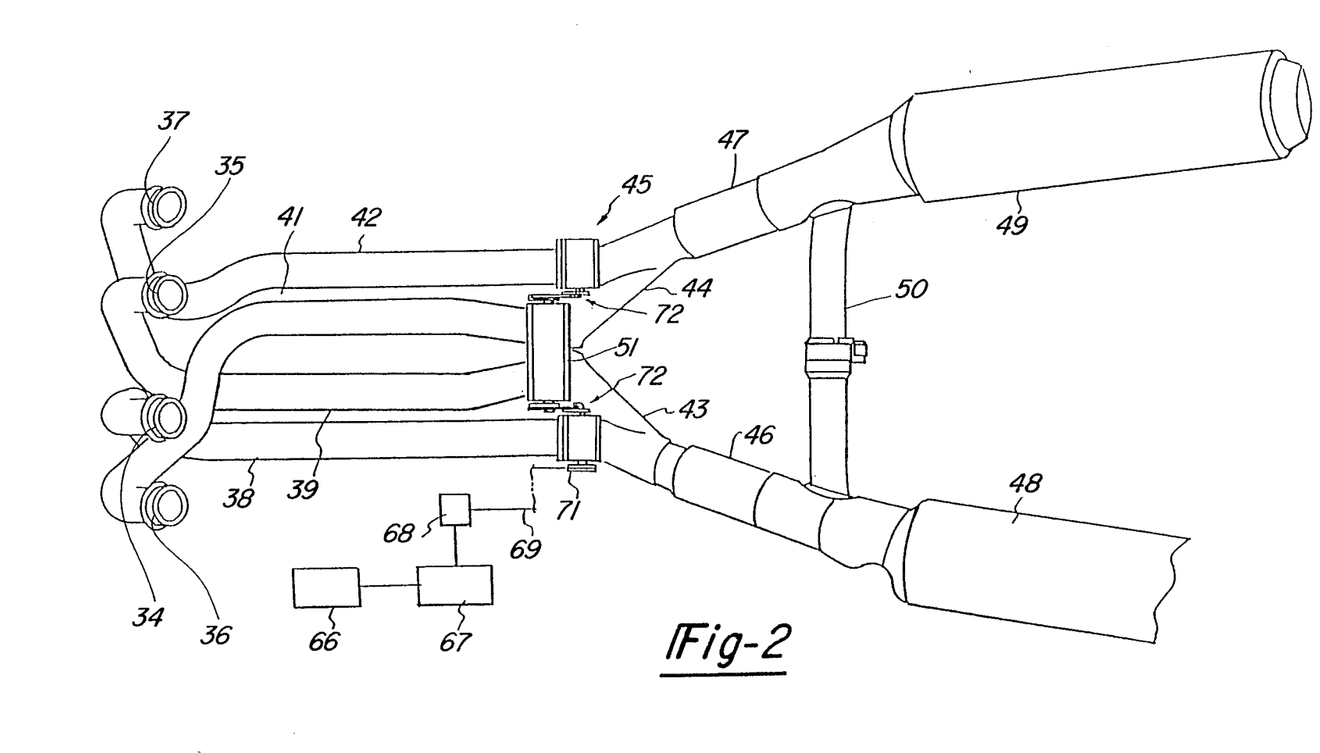
FIG. 2 is an enlarged top plan view showing the exhaust system.
Figure 3:
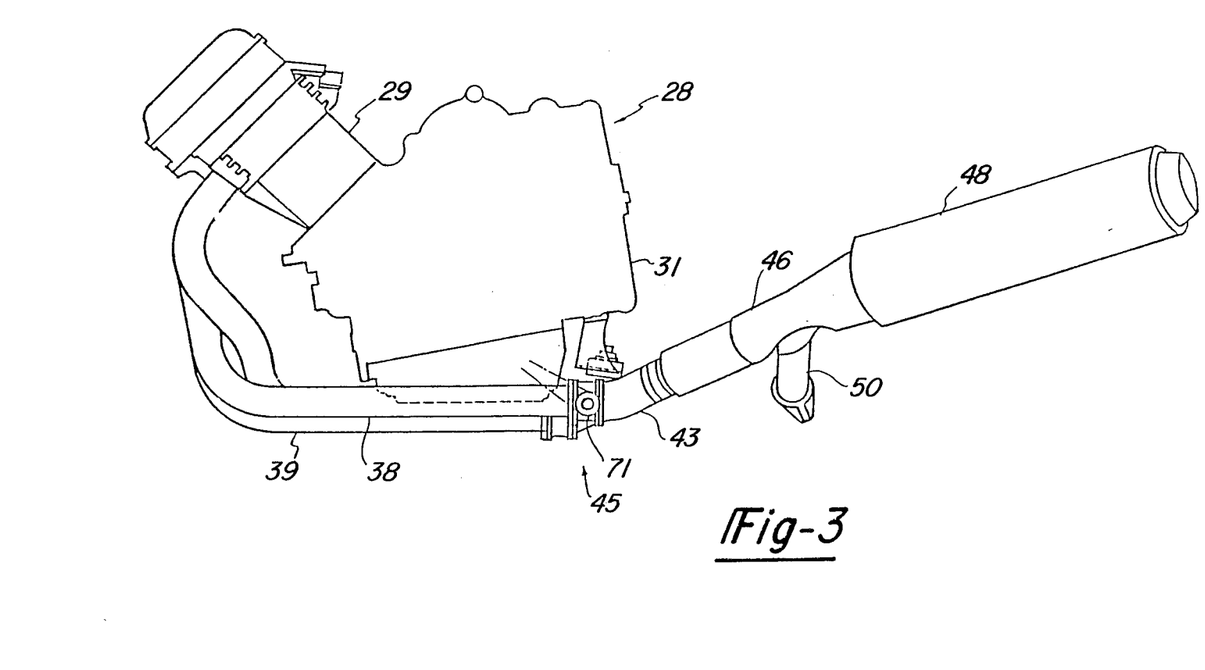
FIG. 3 is a side elevational view, on an enlarged scale, showing the engine and exhaust system.

Referring first in detail to FIG. 1, a motorcycle having an exhaust system constructed in accordance with an embodiment of the invention is identified generally by the reference numeral 21. It is to be understood that a motorcycle is only a typical environment in which the invention may be employed and that the invention has utility in a wide variety of engine applications. However, the invention has particularly utility in connection with a motorcycle since such vehicles are extremely compact and readily illustrate the way in which the invention is adapted to such compact vehicles.

Because the motorcycle 21 is depicted for illustrative purposes only, its major components have been shown in phantom and will be described only generally. The motorcycle 21 includes a frame assembly 22 that mounts a fuel tank 23 and seat 24. A handlebar assembly 25 is journaled at the front part of the frame assembly 22 for steering a front wheel 26 that is supported in any known manner. In addition, the frame assembly 22 supports a rear wheel 27 for suspension movement in any known manner.

An internal combustion engine, indicated generally by the reference numeral 28, is supported within the frame assembly 22 beneath the fuel tank 23. The engine 28 includes a cylinder block assembly 29 and a combined crankcase transmission assembly 31. The crankcase transmission assembly 31 affords a means for driving the rear wheel 27, as by means of a driving chain 32.

The engine 28 is provided with an exhaust system, indicated generally by the reference numeral 33 and which embodies the invention. The exhaust system 33 may comprise either the exhaust system shown in the embodiments of FIGS. 2 through 4, the exhaust system of FIGS. 6 through 11, the exhaust system of FIG. 12, or the exhaust system of FIGS. 13 and 14. In FIG. 1, the exhaust system of FIGS. 2 through 5 is specifically illustrated.

Referring now to those figures (2 through 5), the engine 28 has its cylinder block 29 formed with four cylinder bores that are aligned transversely relative to the motorcycle 21. It is to be understood that the invention may be employed in connection with engines of other cylinder number of configurations. However, the invention has particularly utility with engines that have at least two cylinders.

Because of its transverse disposition, the cylinder block 29 has four forwardly facing exhaust ports (not shown). Inlet flanges 34, 35, 36 and 37 of respective exhaust pipes 38, 39, 41 and 42 cooperate with these exhaust ports for receiving the exhaust gases and carrying them downwardly and rearwardly. The exhaust pipes 38 and 39 and 41 and 42 are paired for tuning purposes and merge into respective collector sections 43 and 44 which also serve as expansion chambers. A reflective control valve arrangement, indicated generally by the reference numeral 45, is interposed between the exhaust pipes 38, 39, 41 and 42 and the expansion chambers 43 and 44 for a purpose to be described. Tail pipes 46 and 47 extend rearwardly from the expansion chambers 43 and 44 and deliver the exhaust gases to a pair of mufflers 48 and 49 that lie on opposite sides of the rear wheel 27 for discharge of the exhaust gases to the atmosphere. The tail pipes 46 and 47 are interconnected by a crossover pipe 50.

It should be noted that the exhaust pipes 39 and 41 lie at a slightly lower level than the exhaust pipes 38 and 42 so as to clear the transmission crankcase assembly 31 and to afford a compact nature. This arrangement also permits the rider to lean the motorcycle 21 through a greater bank angle than if the pipes 39 and 42 were at this lower position. This is significant in connection with the construction of the valve assembly 45 which will now be described by primary reference to FIGS. 4 and 5. The valve assembly 45 includes a first valve body 51 that has a pair of exhaust passages 52 and 53 that extend horizontally and which are aligned with and connected to the trailing ends of the exhaust pipes 39 and 41, respectively. A pair of reflective valve members 54 and 55 are supported within the passages 52 and 53, respectively, and are affixed to a common valve shaft 56 that is journaled within the valve body 51 and which extends outwardly beyond its side edges.

Figure 5:
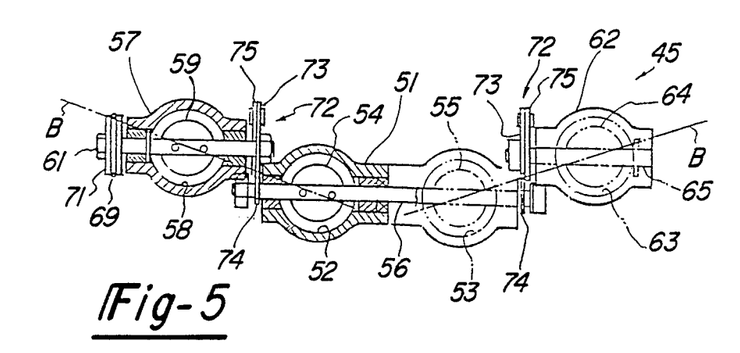
FIG. 5 is a cross-sectional view taken along the line 5—5 of FIG. 4.
Figure 6:
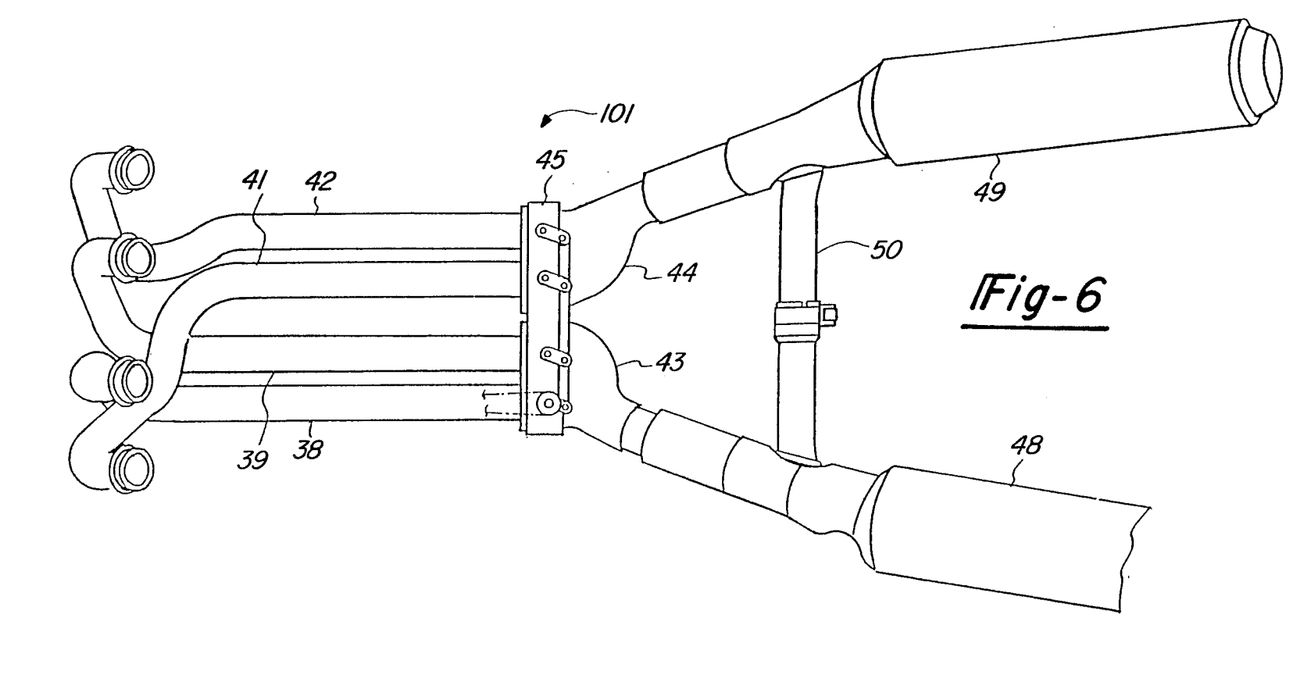
FIG. 6 is a top plan view, in part similar to FIG. 2, showing another embodiment of the invention.
Figure 7:
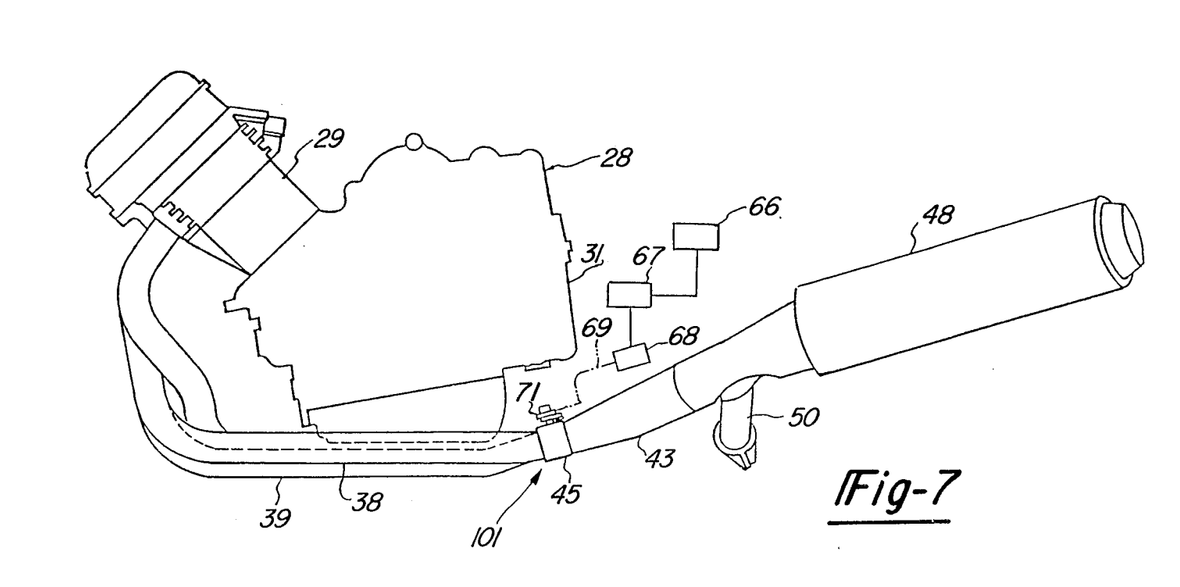
FIG. 7 is a side elevational view showing the engine and exhaust system in accordance with this embodiment.
Figure 8:
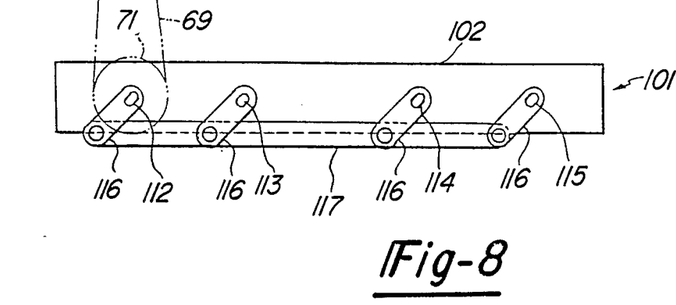
FIG. 8 is an enlarged top plan view showing the control valve arrangement.
Figure 9:
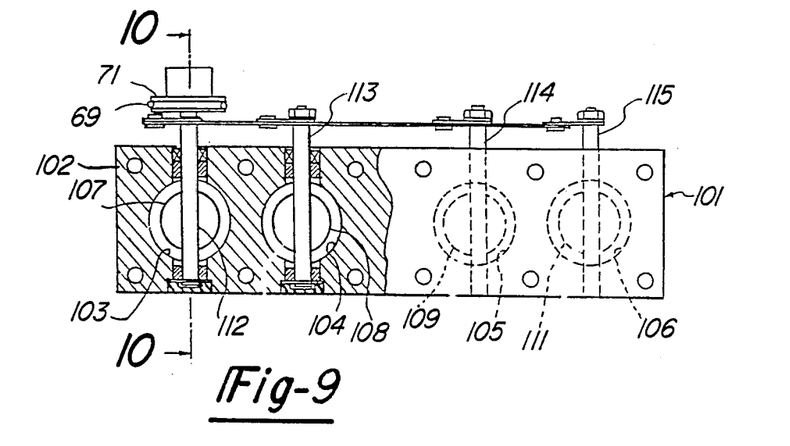
FIG. 9 is an elevational view of the control valve arrangement, with portions broken away.
Figure 10:
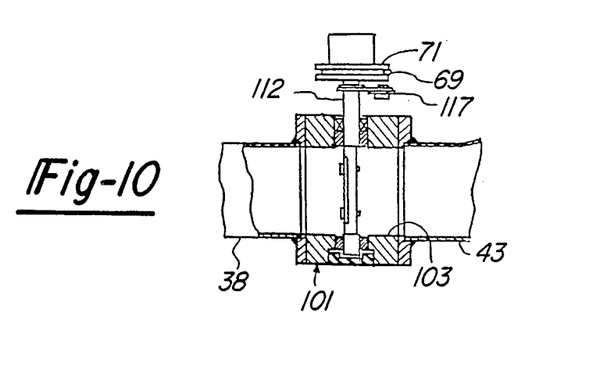
FIG. 10 is a cross-sectional view taken along the line 10—10 of FIG. 9.
Figure 11:
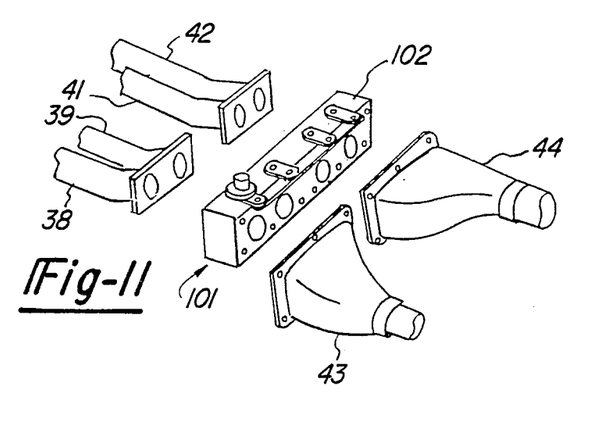
FIG. 11 is a partially exploded perspective view showing the exhaust valve arrangement in accordance with this embodiment.

The valve elements 54 and 55 are of a butterfly type and it will be noted that in their fully closed position as shown in FIG. 5 that they do not fully close off the exhaust passages 52 and 53. They occupy, in an embodiment, approximately 50% of the effective cross sectional area in this position. However, it is to be understood that the specific ratio may be varied depending upon engine parameters and in accordance with the principles set forth in aforenoted copending application Ser. Nos. 935,340 and 935,342.

Figure 4:
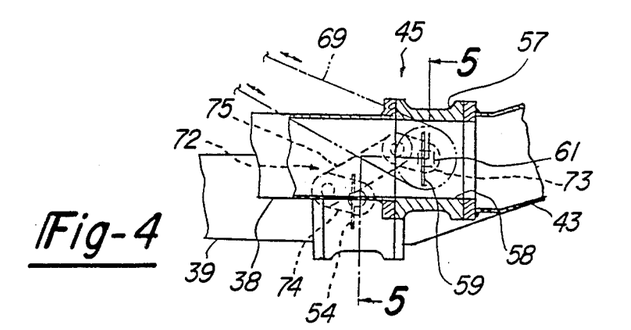
FIG. 4 is an enlarged side elevational view showing the control valve arrangement of this embodiment, with a portion broken away.

A second valve body 57 lies on one side of the valve body 51 and is disposed slightly higher than it. The valve body 57 forms an exhaust gas passage 58 which is aligned with and coupled to the trailing end of the exhaust pipe 38 so as to receive exhaust gases from it. A reflective valve member 59 is rotatably supported in the exhaust passage 58 on the shaft 61 which extends through both sides of the valve body 57, for a purpose to be described.

In a similar manner, a third valve body 62 lies on the other side of the first valve body 51 and defines an exhaust passage 63 that is aligned with the connected to the tailing end of the exhaust pipe 42 so as to receive exhaust gases from it. It should be noted that the valve bodies 57 and 62 lie on substantially the same horizontal plane and that the axes of the exhaust passages 52 and 58 and 53 and 63 are aligned with each other and describe a V angle B-B due to the placement of the exhaust pipes. This places the valve in a protected location and permits a greater bank or leaning angle for the rider when maneuvering, as already noted.

A reflective valve element 64 of the butterfly type is rotatably journaled in the valve housing 62 by means of a shaft 65. The shaft 65 only extends through one end of the valve body 62, this being the end adjacent to the valve body 51.

An arrangement is provided for rotating the valve members 59, 54, 55 and 64 simultaneously between a fully closed position wherein they present the maximum reflective area, as shown in FIGS. 4 and 5, and a fully opoened position wherein they present the minimum reflective area. This mechanism includes a control that is responsive to an engine running condition, such as engine speed, and which is shown schematically in FIG. 2. This includes an engine speed sensor 66 that outputs a speed signal to a control device 67. The control device 67, in turn, positions an actuator such an electric motor 68 or the like which is coupled by means of a flexible cable 69 to a pulley 71 that is affixed to the extending end of the shaft 61 of the valve 59. The actual timing or operating sequence for the valve 59, as has been noted, depends upon a variety of factors and the logic may be understood by reference to aforenoted copending application Ser. Nos. 935,340 and 935,342.

The valve shaft 61 is coupled to the valve shaft 56 and the valve shaft 56 is coupled to the valve shaft 65 by respective motion transmitting mechanisms, indicated generally by the reference numeral 72. Each motion transmitting mechanism 72 includes a first lever 73 that is affixed to the respective shaft 61 or 65 and a second lever 74 that is affixed to the respective end of the shaft 56. The levers 73 and 74 are coupled for simultaneous rotation by means of a link 75 that is pivotally connected at its opposite ends to the levers 73 and 74. As a result of this interconnection, rotation of the shaft 61 will be accompanied by simultaneous rotation of the shaft 56 and shaft 65 so that the valve elements 54, 55, 59 and 64 will all operate in unison.

It should also be noted that the valve bodies 57 and 62 are positioned slightly aft or rearwardly of the valve body 51 so that the valves 59 and 64 may be positioned slightly rearwardly of the valve elements 54 and 55 and so that all of the valve elements may be positioned at the appropriate axial location along the length of their respective pipes. In this way, maximum effect can be obtained for the valve system. Also, it should be noted that the arrangement is such that no one long valve shaft is employed so that the likelihood of binding due to thermal expansion will be substantially minimized if not totally eliminated.

In the embodiment of FIGS. 2 through 5, the valve assembly 45 consists of three separate valve bodies. FIGS. 6 through 11 show another embodiment of the invention which differs from the embodiment of FIGS. 2 through 5 in the construction of the control valve, which is indicated generally by the reference numeral 101. In all substantial regards, except for the relative locations of the exhaust pipes 38, 39, 41 and 42 where they merge into the valve assembly 101 and of the shape of the expansion chambers 43 and 44, the construction of the exhaust system is the same as the previously described embodiment and, for that reason, components which are substantially the same or the same as those of the previously described embodiment have been identified by the same reference numerals and will be described again only in detail in this embodiment as is necessary to understand the embodiment.

Referring primarily to FIGS. 8 through 11, the control valve assembly 101 includes a valve body 102 in which horizontally extending parallel exhaust passages 103, 104, 105 and 106 are formed. Because these passages 103 through 106 are all horizontally disposed and have their axes lying in the same plane, it is necessary for the corresponding mating ends of the exhaust pipes 38, 39, 41 and 42 to be also so disposed at their point of attachment to the valve body 102.

Reflective control valve elements 107, 108, 109 and 111 are positioned within the exhaust passages 103 through 106, respectively. The valve elements 107, 108, 109 and 111 are of the butterfly type but unlike prior art constructions are not all affixed to a common valve shaft that is horizontally disposed. Rather, each of the valves is affixed to a respective vertically extending valve shaft 112, 113, 114 and 115 each of which is journaled in the valve body 102 for rotation about parallel vertically extending axes. Each of the shafts 112, 113, and 114 has affixed to it a respective lever 116. The levers 116 are all interconnected for simultaneous rotation of their associated shaft by means of a common link 117. The link 117 is disposed externally of the valve body 102 and hence will not be heated and subject to thermal expansion to any significant effect. As with the previously described embodiment, the shaft 112 is directly operated by the control device by means including a flexible transmitter 69 and pulley 71.

Figure 12:
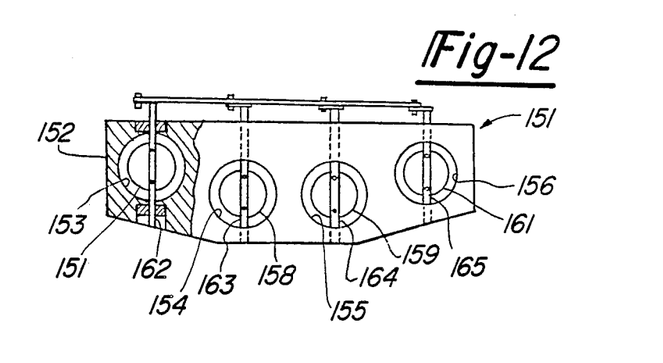
FIG. 12 is an elevational view, in part similar to FIGS. 5 and 9 and with a portion broken away, showing yet a further embodiment of the invention.

FIG. 12 shows another embodiment of control valve, indicated generally by the reference numeral 151. This embodiment is substantially the same as the embodiment of FIGS. 7 through 11 and for that reason only an end elevational view is shown. In this embodiment, like the previously described embodiment, includes a single valve housing 152 in which passages 153, 154, 155 and 156 are formed. Unlike the previously described embodiment of FIGS. 7 through 11, however, the passages 153 and 156 lie on a horizontal plane that is vertically above those of the passages 154 and 155. Hence, the passages 153 and 154 and 155 and 156 define a V shape configuration similar to the embodiment of FIGS. 2 through 5 and thus presents greater clearance for leaning when turning. However, in this embodiment, the passages 153 through 156 are all axially aligned.

Butterfly type throttle valves 157, 158, 159 and 161 are supported in the passages 153 through 156, respectively, on individual vertically extending shafts 162, 163, 164 and 165, respectively. The shafts 162 through 165 are all interconnected at their upper ends by means of a linkage system of the type shown in FIGS. 8 and 9 and thus this system will not be described again in detail.

Figure 13:
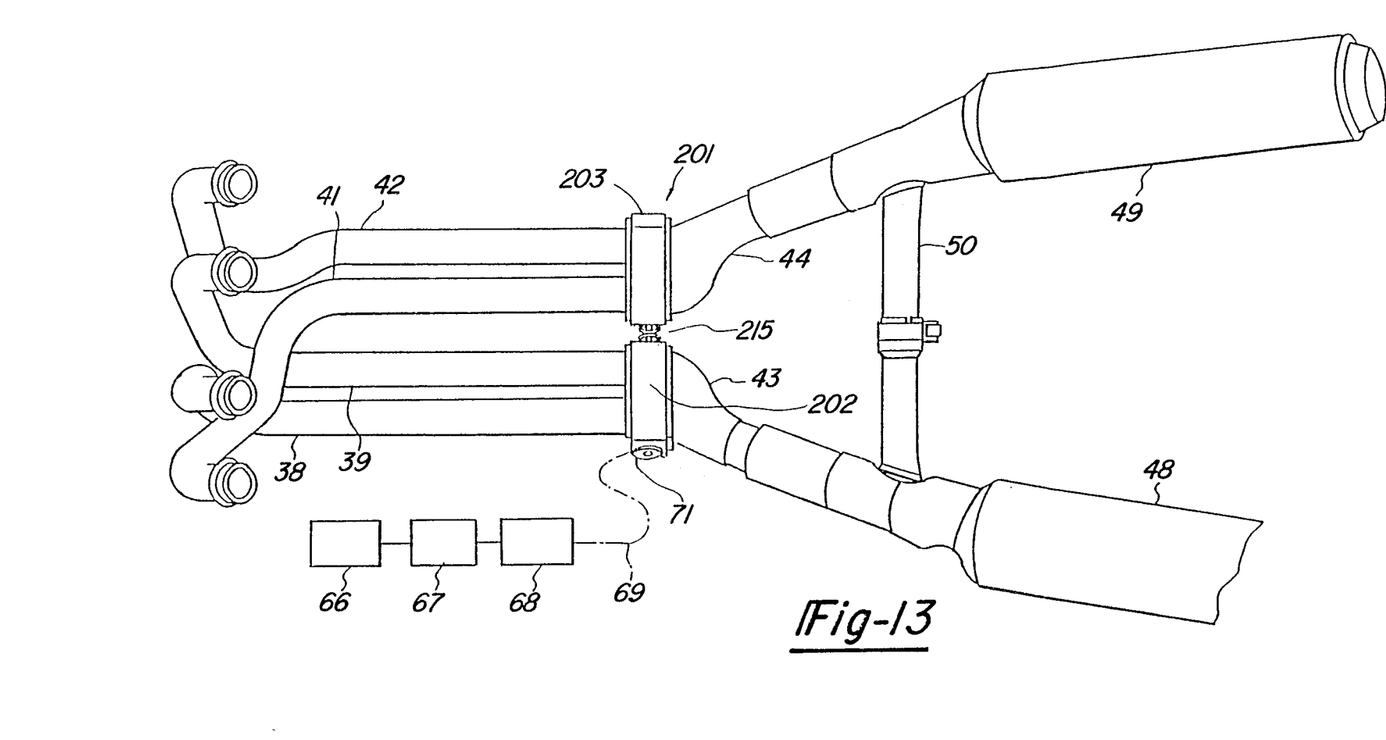
FIG. 13 is a top plan view, in part similar to FIGS. 2 and 6, showing yet another embodiment of this invention.

In the embodiments of the invention thus far described, the individual shafts of the valve elements were connected to each other by means of a linkage system. FIGS. 13 and 14 show a valve construction, indicated generally by the reference numeral 201, which is generally similar to the previously described embodiments but wherein at least certain of the shafts of the valve elements are connected by a system other than a linkage system. In this embodiment, like the previously described embodiments, those elements which are common with the other embodiments have been identified by the same reference numerals and will not be described again.

In this embodiment, the valve mechanism 41 is comprised of a pair of valve bodies 202 and 203 that are disposed at an angular relation to each other and wherein they are axially aligned. As with the embodiments of FIGS. 2 through 5 and 12, this configuration permits greater leaning for maneuvering. The valve body 202 is formed with a lower exhaust gas passage 204 and an upper exhaust gas passage 205 which passages are parallel to each other. In a similar manner, the body 203 is provided with a lower exhaust gas passge 206 and an upper exhaust gas passage 207. The passages 206 and 207 extend horizontally and are parallel to each other and also parallel to the passages 204 and 205 of the body 202.

Individual butterfly type throttle valves 208, 209, 211 and 212 are journaled in the passages 204, 205, 206 and 207, respectively. The valves 208 and 209 are supported on a common valve shaft 213 that is journaled in the body 202 while the valve elements 211 and 212 are affixed to a valve shaft 214 that is journaled within the valve body 203. The shafts 213 and 214 are at an angle to each other and their inner ends are drivingly connected by means of a pair of intermeshing bevel gears 215 so that all of the valve elements will be operated in unison.

It should be readily apparent from the foregoing description that a number of embodiments of exhaust control valves have been illustrated each of which permits an effective operation without detrimental effects due to thermal expansion while at the same time maintaining an effective and simple operation. In addition, the construction is such that the valves may all be controlled simultaneously and there is latitude permitted in the configuration of the associated exhaust pipes.

Although a number of embodiemnts of the invention have been illustrated and described, various changes and modifications may be made without departing from the spirit and scope of the invention, as defined by the appended claims.

What is claimed:

1. In an exhaust system for a vehicle powered by an internal combustion engine having a first exhaust pipe, a second exhaust pipe juxtaposed to said first exhaust pipe, a first reflective means rotatably supported upon a first shaft in said first exhaust pipe, the rotatable position of said first reflective means being effective to vary the reflective area thereof, second reflective means rotatably supported on a second shaft in said second exhaust pipe, the rotatable position of said second reflective means being effective to vary its reflective area, said shafts being positioned at different longitudinal positions along the length of said vehicle, and motion transmitting means for rotatably coupling said first and said second shafts.

2. In an exhaust system as set forth in claim 1 wherein the shafts are non-aligned.

3. In an exhaust system as set forth in claim 2 wherein the shafts are disposed in parallel relationship to each other.

4. In an exhaust system as set forth in claim 3 wherein the shafts are horizontally disposed.

5. In an exhaust system as set forth in claim 3 wherein the shafts lie in different horizontal planes.

6. In an exhaust system as set forth in claim 1 wherein the motion transmitting means comprises a linkage system.

7. In an exhaust system as set forth in claim 1 wherein the exhaust system further includes an expansion chamber positioned downstream of the reflective means.

8. In an exhaust system as set forth in claim 7 wherein wherein the shafts are non-aligned.

9. In an exhaust system as set forth in claim 8 wherein the shafts are disposed in parallel relationship to each other.

10. In an exhaust system as set forth in claim 9 wherein the shafts are horizontally disposed.

11. In an exhaust system as set forth in claim 9 wherein the shafts lie in different horizontal planes.

12. In an xhaust system as set forth in claim 7 wherein the motion transmitting means comprises a linkage system.

13. A vehicle having at least one dirigible wheel and at least one driven wheel, an internal combustion engine for dirving said driven wheel, an exhaust system for said internal combustion engine having a first exhaust pipe, a second exhaust pipe juxtaposed to said first exhaust pipe, said exhaust pipe extending at least in part beneath said internal combustion engine, a first reflective means rotatably supported upon a first shaft in said first exhaust pipe beneath said internal combustion engine, the rotatable position of said first reflective means being effective to vary the reflective area thereof, second reflective means rotatably supported on a second shaft in said second exhaust pipe beneath said internal combustion engine, the rotatable position of said second reflective means being effective to vary its reflective area, an expansion chamber positioned downstream of said reflective means, and motion transmitting means for rotatably coupling said first and second shafts, said shafts being disposed at different axial locations relative to each other.

* * * * *